March 19, 1957 G. W. REED 2,785,917
CHINCHILLA CAGE DOOR LATCH
Filed Dec. 16, 1953

INVENTOR
George W. Reed
BY Mason, Fenwick & Lawrence
ATTORNEYS

United States Patent Office 2,785,917
Patented Mar. 19, 1957

2,785,917

CHINCHILLA CAGE DOOR LATCH

George W. Reed, Front Royal, Va.

Application December 16, 1953, Serial No. 398,537

4 Claims. (Cl. 292—210)

The present invention relates in general to animal cages, and more particularly to construction of cage doors for chinchilla cages.

Cages for restraining animals such as chinchillas are commonly formed of rectangular enclosures having the side, top, bottom and end wall panels formed of wire mesh supported on rectangular frames. A door occupying substantially the entire area of one of the end walls is commonly provided. This door is usually pivotally supported for swinging movement about a vertical axis by means of a pair of spaced hinges secured to one lateral edge of the door and a latch mechanism of conventional form having a projecting bar or tongue is centrally located at the other lateral edge of the door to cooperate with a keeper on the cage frame.

Because of the construction of such doors from a rectangular frame and wire mesh, and the provision of a pair of spaced supporting hinges at one end and a single projecting latch bar at the other, the upper and lower corners of the keeper supporting end of this type of cage door can be readily tilted or canted out of the normal plane of the door, leaving a space between the door frame and the frame for the door opening. This presents a serious problem in connection with the raising of chinchillas.

It has been found that chinchillas spend a substantial proportion of the day running around the cage on the side and end walls in a plane parallel to the bottom of the cage and located near the top. It frequently happens that the chinchilla hits the cage door at the latch supporting end with sufficient force to cant the upper corner out from the cage and the animal's leg slips through the space thus exposed between the upper corner of the door and the door opening frame. When this happens, the momentum of the animal and the resilient force of the door returning the door to normal position usually combine in such circumstances to break the animal's leg. The financial loss to chinchilla raisers from this source has been substantial.

An object of the present invention, therefore, is the provision of a novel door construction for animal cages which will eliminate the above mentioned disadvantages.

Another object of the present invention is the provision of a novel door construction for animal cages wherein the door may be formed of wire mesh and an open rectangular frame, but will be restrained against deformation out of its normal plane.

Another object of the present invention is the provision of a novel latching mechanism for chinchilla cage doors which will hold the door at all times flush against the cage door opening frame and prevent the corners of the door from canting away from the door opening frame.

Other objects, advantages and capabilities of the present invention will become apparent from the following detail description, taken in conjunction with the accompanying drawing, showing only a preferred embodiment of the invention.

Figure 1:
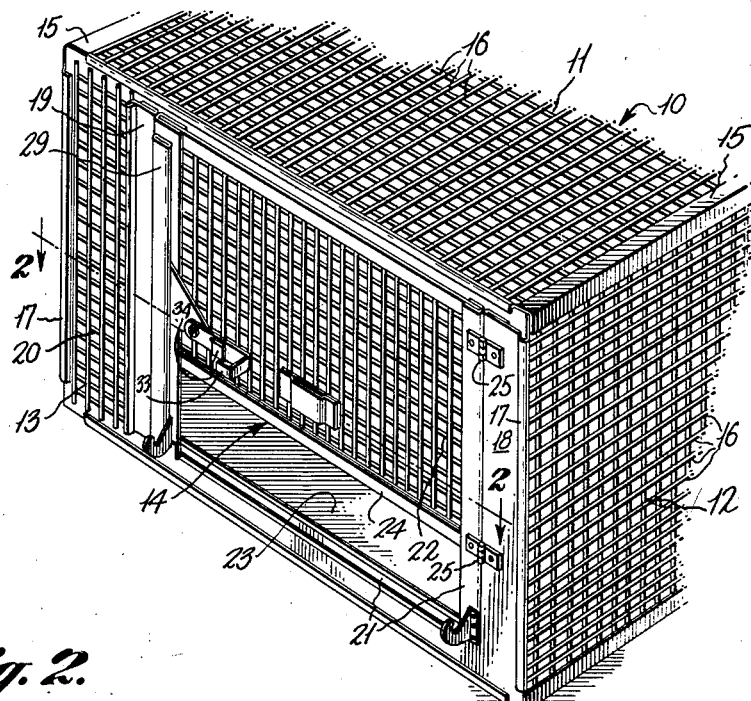
Figure 1 is a fragmentary perspective view of the end portion of a chinchilla cage embodying the door construction of the present invention.

Referring to the drawing, wherein like reference characters designate corresponding parts throughout the several figures, the reference character 10 illustrates a generally box-shaped chinchilla cage having a top panel 11, side panel 12, an end panel 13, including a hinged door 14. The chinchilla cage 10 is preferably of the conventional commercial type having a hollow rectangular body section formed of the top, side and bottom panels, each formed of sheet metal edge frames 15 supporting sheets of wire mesh screen 16, the rectangular body section being closed at opposite ends by removable end panels.

The end panel 13 in which the door 14 is provided, preferably comprises a plurality of peripheral sheet metal framing strips 17 forming an open rectangular frame conforming to the cross section of the body section of the cage 10. In accordance with conventional practice, these framing strips 17 are adapted to interfit along their outer edges with complementary portions of the frames 15 of the top, side and bottom panels of the cage to be rigidly held in enclosing relation with the body section. Vertical framing strips 18 and 19, both preferably formed of sheet metal, are provided in the end panel 13 to define, with the horizontal peripheral framing strips 17, a large rectangular door opening. One of the vertical door opening framing strips 18 is preferably riveted or otherwise rigidly secured to one of the vertical peripheral framing strips 17 of the end panel 13 and to the upper and lower horizontal peripheral framing strips 17, and the other vertical door opening framing strip 19 is secured at its upper and lower ends to the upper and lower horizontal peripheral framing strips 17 of the end panel 13 at a point spaced from the lateral edge of the end panel opposite that with which the door opening framing strip 18 is associated. A section of wire screen 20 extends between the door framing strip 19 and its adjacent parallel peripheral framing strip 17 to close the space extending therebetween.

The door 14 is formed in a conventional manner and comprises a rectangular frame 21 of sheet metal strips, supporting a wire screen 22 extending over the major portion of the area defined between the door frame members. In accordance with conventional practice, a suitable feed trough access opening 23 may be provided along the lower portion of the door 14 by terminating the wire screen 22 in a sheet metal strip 24 extending between the vertical door frame members at a point along a horizontal axis spaced above the lower edge of the door 14. The door is preferably pivotally supported for movement outwardly of the cage 10 by means of hinges 25 secured to the vertical door opening framing strip 18. The door is of such a size that the lateral vertically disposed door frame members 21 lie inwardly of the door opening framing strips 18 and 19 when the door is in closed position while the upper and lower horizontal door frame members 21 overlie the upper and lower peripheral framing strips 17 of the end panel 13.

Figure 2:
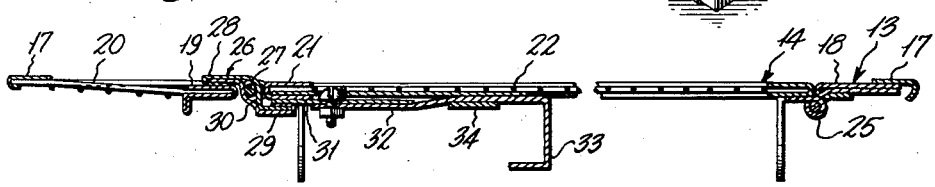
Figure 2 is a horizontal transverse section view of the cage door and associated cage end wall, illustrating the door in closed and latched condition, taken along the lines 2—2 of Figure 1; and, Figure 3 is a fragmentary section view similar in location to that of Figure 2, but showing the cage door in partially open condition.
Figure 3:
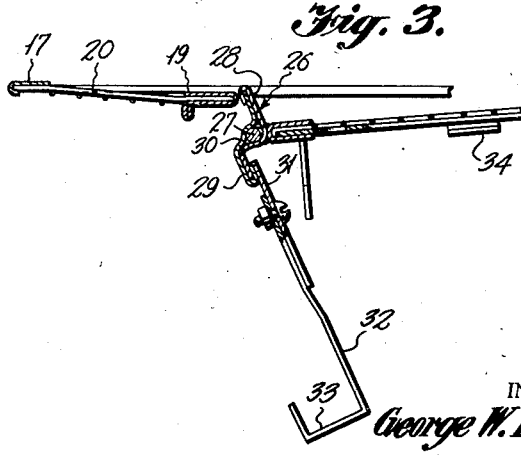

A distinctive door latching mechanism is provided to prevent the portions of the door 14 remote from the hinges 25 from being twisted away from the upper and lower peripheral frame members 17 of the end panel 13 and avoid damage to the caged animals resulting from such deformation of the door. This latching mechanism, which is illustrated more clearly in Figure 2 and 3, comprises a substantially Z-shaped pivoted latching plate 26 pivotally supported on a vertically extending rod 27 fixed at its upper and lower ends outwardly of and parallel to the vertical door frame member 21 at the free end of the door 14. This latching plate 26 is formed of a pair of offset parallel flanges 28 and 29 extending in opposite directions from a transverse web 30 interconnecting the flanges, and is of approximately the height of the door opening. The flange 28 is adapted to be disposed in a plane located slightly inwardly of and parallel to the plane of the door 14 in overlying relation with the inner face of the door opening framing strip 19 when the door is in closed position. The flange 29 extends diametrically opposite to the flange 28 relative to the web 30 and is adapted to overlie in contacting relation the outer face of the door frame member 21 on the free end of the door 14 when the door is in closed position. A triangular extension plate 31 is welded, soldered, or otherwise secured to the outer offset flange 29 of the latching plate 26, and a control lever 32 having its inner end overlying and pivotally secured to the extension plate 31 and its outer end curved into a hook formation 33, is provided for pivoting the latching plate 26 on the pivot rod 27. A holding bracket 34 formed of a strip of sheet metal is fixed to the outer surface of the door 14 in upwardly opening relation to receive the control lever 32 when the same is pivoted downwardly to a substantially horizontal position in face-to-face relation overlying the door to hold the door in closed position.

The operation of the present invention is substantially as follows:

Assuming that the lever 32 has been shifted outwardly of the door 14 to a position substantially perpendicular to the plane of the door, the flange 28 of the latching plate 26 will have been likewise rotated about the vertical pivot rod 27 to position the flange 28 to clear the inner edge of the door opening framing strip 19. When the door is in closed relation with the upper and lower door frame member 21 overlying the upper and lower peripheral framing strips 17 of the end panel 13, the lever 32 is rotated relative to the pivot rod 27 toward the door 14 to bring the lever 32 into overlying parallel relation to the door. This movement of the lever 32 rotates the latching plate 26, shifting the inner latching flange 28 into overlying contacting relation with the inner surface of the door opening framing strip 19 along the entire height of the door opening. When the lever 32 is rotated downwardly about its pivotal coupling to the extension plate 31 to seat the lever 32 in the holding bracket 34, the door will be securely held in closed relation. Because the flange 28 of the latching plate 26 extends the entire height of the door opening, the door framing members 21 are securely held against movement or warping out of the normal plane of the door parallel to the plane of the end panel 13, thus avoiding any such warping of the door as may cause injury to the caged animals.

While but one particular embodiment of the invention has been particularly shown and described, it is apparent that various modifications may be made in the invention without departing from the spirit and scope thereof, and it is desired, therefore, that only such limitations shall be placed thereon as are imposed by the prior art and are set forth in the appended claims.

I claim:

1. A latch mechanism for use with an enclosure having a hinged door and a door opening frame associated therewith, comprising a latching plate carried by the door on a pivotal axis disposed parallel to and outwardly of the free edge of the door, said latching plate having a portion of substantially the height of the door opening along the free edge of said door to be disposed to bear against the inner surface of the adjacent door opening frame portion and form a protective inner flap entirely covering the space between the free edge of the door and the adjacent door opening frame portion when said plate is disposed in latching position and to swing to a plane substantially at right angles to the plane of said door to clear said frame portion and release said door to be opened, manually operable means secured to said latching plate and disposed outwardly of the door for swinging said plate into and out of latching relation with the door opening frame portion, and holding means for releasably holding said manually operable means against movement when said plate is in latching relation against said door opening frame portion.

2. A latch mechanism for use with an enclosure having a rectangular door opening frame and a rectangular door hinged to said frame along a vertical edge thereof, comprising a latching plate pivotally supported outwardly of the free vertical edge of said door on an axis parallel thereto, said plate having a flange portion of substantially the height of said door opening to bear against the inner surface of the adjacent door opening frame portion in latching relation therewith when said flange is disposed substantially parallel to the plane of said door and form a protective inner panel entirely covering the space between said free edge of said door and said adjacent frame portion and to swing free of said frame portion to release said door to be opened, a manual control lever secured to said latching plate and extending outwardly of said door for controlling swinging of said latching plate to and from latching position, and holding means on said door for releasably securing said control lever in a position to maintain said latching plate in latching position.

3. A latch mechanism for use with an enclosure having a rectangular door opening frame and a rectangular door hinged to said frame along a vertical edge thereof, comprising an elongated latching plate having a pair of parallel laterally offset oppositely extending flanges and an interconnecting web, said flanges being of the height of said door opening, a pivot rod supported on said door on an axis parallel to and spaced outwardly of the free vertical edge of said door located in the plane of said door, means pivotally connecting said web with said pivot rod, one of said flanges extending outwardly of the free edge of said door in a plane disposed just inwardly of the inner face of said door when said latching plate is in alignment with the plane of said door to bear against the inner surface of the adjacent door opening frame portion throughout the height of said door opening and form a protective inner panel entirely covering the space between said free edge of said door and said adjacent frame portion and latch said door in closed position, said latching plate being pivotally movable to a position wherein said outwardly extending flange is disposed to clear said frame portion on opening movement of said door, a manual control lever pivoted for vertical movement to the other flange of said latching plate to control movement of said latching plate on said pivot rod, and a releasable holding member fixed on the outer face of said door to receive and releasably grasp said control lever when the control lever is in a position overlying the outer face of said door, said latching plate being disposed in latching position when said control lever is positioned to be grasped by said holding member.

4. A latch mechanism for use with an animal cage having a rectangular door opening frame and a rectangular door of greater height than the door opening hinged to said frame along a vertical edge thereof, comprising an elongated latching plate having a pair of parallel laterally offset oppositely extending flanges and an interconnecting web, said flanges being of the height of said door opening, a pivot rod supported on said door on an axis parallel to and spaced outwardly of the free vertical edge of said door located in the plane of said door, means pivotally connecting said web with said pivot rod, one of said flanges extending outwardly of the free edge of said door in a plane disposed just inwardly of the inner face of said door when said latching plate is in alignment with the plane of said door to bear against the inner surface of the adjacent door opening frame portion throughout the height of said door openings and form a protective inner panel entirely covering the space between said free edge of said door and said adjacent frame portion and latch said door in closed position and the other flange extending over the adjacent portion of said door, said latching plate being pivotally movable to a position wherein said outwardly extending flange is disposed to clear said frame portion on opening movement of said door, a manual control lever pivoted for vertical movement in the plane of said latching plate to the other flange of said latching plate to control swinging movement of said latching plate on said pivot rod to and from latching position, and a releasable upwardly opening holding clip fixed on the outer face of said door to receive and releasably grasp said control lever when the control lever is in a plane parallel to the outer face of said door and is rotated downwardly to a horizontal position, said latching plate being disposed in latching position when said control lever is positioned to be grasped by said holding clip.

References Cited in the file of this patent
UNITED STATES PATENTS

| | | |
|---|---|---|
| 1,538,581 | O'Connor | May 19, 1925 |
| 1,919,328 | Hansen | July 25, 1933 |
| 2,038,876 | Sonabend | Apr. 28, 1936 |